United States Patent
Singh et al.

(10) Patent No.: US 9,391,827 B1
(45) Date of Patent: Jul. 12, 2016

(54) CONDITIONAL AUDIO CONTENT DELIVERY METHOD AND SYSTEM

(75) Inventors: Ujjwal Singh, Mountain View, CA (US); Nikhyl Singhal, Sunnyvale, CA (US); Janahan Vivekanandan, Oakland, CA (US)

(73) Assignee: Google Inc., Mountain View, CA (US)

(*) Notice: Subject to any disclaimer, the term of this patent is extended or adjusted under 35 U.S.C. 154(b) by 1023 days.

(21) Appl. No.: 12/950,942

(22) Filed: Nov. 19, 2010

Related U.S. Application Data

(60) Division of application No. 11/947,421, filed on Nov. 29, 2007, now Pat. No. 7,860,995, which is a continuation of application No. 11/788,474, filed on Apr. 20, 2007, now abandoned.

(60) Provisional application No. 60/745,184, filed on Apr. 20, 2006.

(51) Int. Cl.
| | |
|---|---|
| G06F 15/16 | (2006.01) |
| H04L 29/06 | (2006.01) |
| G06F 12/00 | (2006.01) |

(52) U.S. Cl.
CPC ..................... *H04L 29/06* (2013.01)

(58) Field of Classification Search
CPC .................................................... G06Q 30/02
USPC .............. 709/217–219, 203, 223–229, 246, 709/231–232, 250
See application file for complete search history.

(56) References Cited

U.S. PATENT DOCUMENTS 5,862,136 A * 1/1999 Irwin .................... 370/395.4
5,883,964 A   3/1999 Alleman (Continued)

FOREIGN PATENT DOCUMENTS

| EP | 1499099 | 1/2005 |
|---|---|---|
| EP | 1708470 | 5/2012 |

(Continued)

*Primary Examiner* — Zarni Maung
(74) *Attorney, Agent, or Firm* — Fish & Richardson P.C.

(57) ABSTRACT

A method of transmitting audio content over a communication network includes generating a predetermined audio content in a format capable of being transmitted to members in the publisher's network; receiving a request for the predetermined audio content from the members interested in receiving the audio content; embedding advertisements into the predetermined audio content selected according to details describing each of the members and transmitting to each of the members the predetermined audio content embedded with the advertisements selected specifically for each member. Additionally, a communication method selectively transmits messages between a publisher and members of a publisher's network. The communication method includes receiving a request from a member of the publisher's network to communicate with the publisher, ordering the request to communicate from the member according to a queuing scheme that serializes the request with other requests from other members of the publisher's network, determining if a response to the request from the member should be made through a synchronous interactive communication channel rather than the queuing scheme and an asynchronous communication channel, ordering a response from the publisher responsive to the determination and according to a queuing scheme that serializes the response to the request along with other responses to other requests over the asynchronous communication channel from other members and establishing the synchronous interactive communication channel responsive to the determination that circumvents the queuing scheme and is capable of delivering a response to the request directly to the member making the request.

21 Claims, 12 Drawing Sheets

(56) References Cited

U.S. PATENT DOCUMENTS

| | | | |
|---|---|---|---|
| 6,219,638 B1 | 4/2001 | Padmanabhan et al. | |
| 6,684,249 B1 | 1/2004 | Frerichs et al. | 709/225 |
| 7,017,173 B1 | 3/2006 | Armstrong et al. | 725/87 |
| 7,263,182 B2 | 8/2007 | Allen et al. | |
| 7,668,245 B2 * | 2/2010 | Hofmeister et al. | 375/260 |
| 7,860,995 B1 * | 12/2010 | Singh et al. | 709/231 |
| 8,176,189 B2 * | 5/2012 | Traversat et al. | 709/230 |
| 8,359,007 B2 * | 1/2013 | White et al. | 455/410 |
| 8,359,397 B2 * | 1/2013 | Traversat et al. | 709/230 |
| 8,578,039 B2 | 11/2013 | Pounds et al. | |
| 2003/0066091 A1 | 4/2003 | Lord et al. | 725/135 |
| 2004/0117819 A1 | 6/2004 | Yu | 725/32 |
| 2007/0097975 A1 | 5/2007 | Rakers et al. | 370/392 |
| 2007/0244906 A1 | 10/2007 | Colton et al. | |
| 2008/0198987 A1 | 8/2008 | Daly | |
| 2009/0132364 A1 | 5/2009 | Agarwal | 705/14 |
| 2013/0094647 A1 | 4/2013 | Mauro et al. | |

FOREIGN PATENT DOCUMENTS

| | | |
|---|---|---|
| WO | WO 99/55049 | 10/1999 |
| WO | WO 01/37177 | 5/2001 |
| WO | WO 01/39013 | 5/2001 |
| WO | WO 01/69422 | 9/2001 |
| WO | WO 03/030507 | 4/2003 |
| WO | WO 2005/069654 | 7/2005 |
| WO | WO 2007/067381 | 6/2007 |

* cited by examiner

CONDITIONAL AUDIO CONTENT DELIVERY METHOD AND SYSTEM This application is a divisional of U.S. patent application Ser. No. 11/947,421 by Singh et al. filed Nov. 29, 2007 entitled "CONDITIONAL AUDIO CONTENT DELIVERY METHOD AND SYSTEM" which in turn is a continuation of U.S. patent application Ser. No. 11/788,474 by Singh, et al. filed Apr. 20, 2007, entitled "METHOD AND SYSTEM FOR MULTIMOIDAL COMMUNICATION USING A PHONE NUMBER", which claims the benefit of U.S. Provisional Application Ser. No. 60/745,184 by Singh et al. filed Apr. 20, 2006, entitled "METHOD AND SYSTEM FOR TELEPHONIC COMMUNICATION OVER A REUSABLE PHONE NUMBER", wherein both U.S. Ser. Nos. 11/947, 421 and 11/788,474 are incorporated by reference in the entirety for all purposes.

INTRODUCTION

Conventional telephone systems have been largely limited to communication between two parties. A first individual may call another person and talk or, if the person is not available, leave a message on voicemail. Upon receiving the message, the person may return the call immediately or at some later point in time.

Unfortunately, if the first individual wants a more immediate response he may attempt to call the other person many times over until he gets a response. The person receiving the call may not welcome the call but has no choice in receiving these calls. Even with caller-id functionality, the first individual may be able to block their caller-id and hide their identity. As a last resort, the person receiving the unwanted call may have to get a new phone number and pay the phone company to delist it.

Inconsistent availability of caller-id also makes it difficult for people to return calls. Many times digital phone systems do not provide a call back number for a person to return calls. This is also true when phone systems from different carriers attempt to communicate and do not pass caller-id information correctly. In some cases this is because many carriers have proprietary solutions and applications available only within their network. In some cases, the carriers do not implement communication protocols with sufficient rigor to achieve full compatibility with established standards.

As a consequence, voice based communication has yet to take advantage of many newer communication techniques on a broader level. This can be partially attributed to incompatibilities between carriers and complexities in the overall telecommunication network.

BRIEF DESCRIPTION OF THE DRAWINGS

The present invention is illustrated by way of example and not limitation in the figures of the accompanying drawings in which.

Like reference numbers and designations in the various drawings indicate like elements.

SUMMARY

Figure 1A:
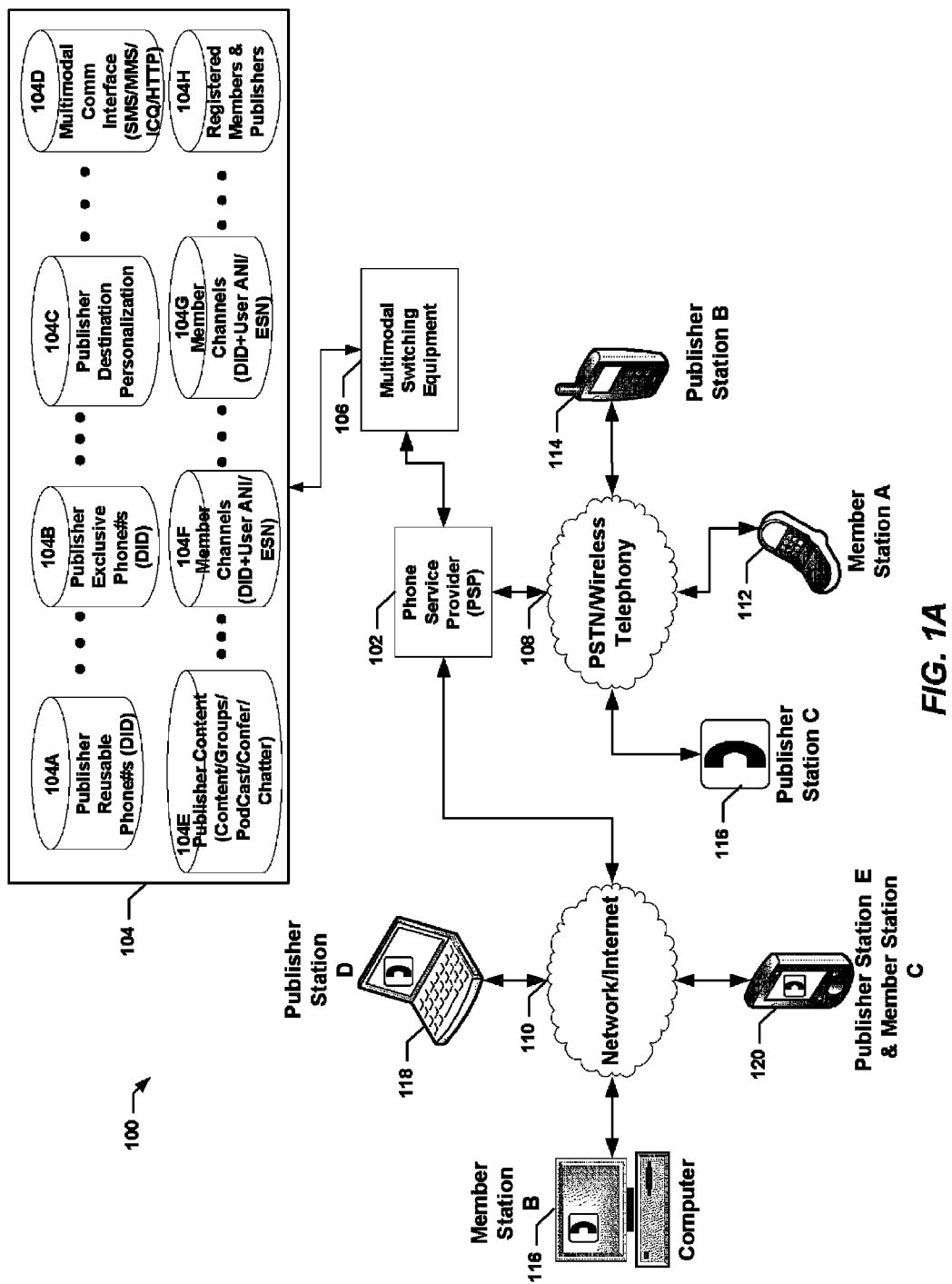
FIG. 1A is a schematic diagram of communication system in accordance with aspects of the present invention.

One aspect of the present invention features a method of transmitting audio content over a communication network. The transmission approach includes generating a predetermined audio content in a format capable of being transmitted to one or more members in the communication network/publisher's network, receiving a request for the predetermined audio content from the one or more members interested in receiving the audio content, embedding one or more advertisements into the predetermined audio content selected according to one or more details describing each of the one or more members and transmitting to each of the one or more members the predetermined audio content embedded with the one or more advertisements selected specifically for each of the one or more members over the communication network.

Another aspect of the invention concerns a communication method for selective transmission of messages between a publisher and one or more members of a publisher's network. The communication method includes receiving a request from a member of the publisher's network to communicate with the publisher, ordering the request to communicate from the member of the publisher's network according to a queuing scheme that serializes the request with other requests from one or more other members of the publisher's network, determining if a response to the request from the member should be made through a synchronous interactive communication channel rather than the queuing scheme and an asynchronous communication channel, ordering a response from the publisher responsive to the determination and according to a queuing scheme that serializes the response to the request along with other responses to one or more other requests over the asynchronous communication channel from other members of the publishers network in accordance with determining the publisher's indication and establishing the synchronous interactive communication channel responsive to the determination that circumvents the queuing scheme and is capable of delivering a response to the request directly to the member of the publisher's network making the request.

DETAILED DESCRIPTION

Aspects of the present invention concern a communication method and system for users to exchange voice, data and engage in business and/or social interactions. Through an intermediary phone service provider, a user can publish content (e.g., the publisher) and then invite one or more other users to become members and access the published content. In one instance, the invite sent to the other users may include an inward phone number to be dialed with a phone or referenced in an SMS message. Users that dial or reference this inward phone number are invited to opt-in or join the publisher's network of members. If it is more convenient, 'badge' may be sent to the other users in an email or made available on a web-page. Selecting the badge also allows the invited users to join the publisher's network of members if they opt-in to the publisher's network and terms as provided by the voice service provider.

Each time the publisher updates their content, the intermediary phone service provider sends a direct notification to the members of the publisher's network using the member's phone number and their telephone device. Subsequent communication and interaction between members, the publisher and the members uses a multimodal communication access interface managed by the phone service provider. This allows each member to not only receive content from the publisher but also to send content back to the publisher and other members in the publisher's network. Various modes of the communication access interface also allow the members to transmit content messages using short messaging system (SMS), web-based or WAP applications, and conventional HTTP. It is also possible for members to interact with applications specifically made available to members of the publisher's network.

Aspects of the present invention include many benefits including, but not limited, to those indicated herein below. First, a publisher can invite many members into their network without disclosing the actual phone number of their terrestrial or wireless phone. The phone service provider provides each publisher with an inward phone number that operates like a conventional phone number while separating the publisher from direct contact with member's of their network. Resulting communication between the publisher and the members made using this inward phone number may be delayed and indirect but still retains the personal touch associated with voice communication. Second, the phone service provider has the option of using a reusable phone number to reduce the costs of allocating and provisioning large numbers of phone numbers or direct inward dial (DID) resources. The reusable phone number is a non-exclusive phone number used as an inward phone number to the network and indexed by both the member's phone number and the targeted or requested published content. Further, the inward phone number and services provided by the phone service provider allows new services to be developed that span multiple different carriers. These new services are carrier independent. This allows publishers of content to create networks of members that do not have to belong to the same wireless service provider or even have the same telephony technology. Indeed, aspects of the present invention can be adapted to work with various telephonic systems as long as the publisher and members have been provisioned an identifiable phone number by their phone company provider.

FIG. 1A is a schematic diagram of communication system 100 in accordance with aspects of the present invention. In this example, communication system 100 includes a phone service provider (PSP) 102, a content publishing system 104, multimodal switching equipment 106, a PSTN/Wireless Telephony Network 108 (hereinafter telephony network 108), a data network/Internet 110 (hereinafter data network 114), member station A 112, publisher station B 114, member station B 116, publisher station C 116 and publisher station D 118 and publisher station E/member station C 120.

PSP 102 facilitates the operation of communication system 100 using applications and infrastructure to support communication between publishers and members of their networks. In one implementation, PSP 102 allows publishers to register with the communication system 100 and create and publish content made available to members of their network. Further, users interested in receiving this content can register as members of one or more networks assembled by the one or more publishers in order to receive this content. For example, the publishers may be members of rock band that want to provide concert information, digital music and exclusive ringtones available for purchase to members of their fan club. Fans of the rock band may be invited by the rock band members to join their exclusive fan club as administered by PSP 102 using infrastructure and applications within communication system 100. These fans would join the rock band's fan club and register as members through PSP 102. Alternative example use of communication system 102 may be applied in a similar manner to other types of organizations including sales teams with managers and sales representatives, philanthropic clubs with boards and members, sports teams with coaches and team members as well as many other personal interest organizations centered around membership and a common interest.

Content publishing system 104 schematically represents one or more applications, infrastructure and published content made available by one or more publishers to their respective members. Databases depicted in content publishing system 104 also represent all the applications, middleware, drivers and other subsystems required to access, manage, manipulate, edit and publish the content and make it available through PSP 102 over communication system 100. Accordingly, these databases include: publisher reusable phone numbers 104A, publisher exclusive phone numbers 104B, publisher destination personalization 104C, multimodal communication interfaces 104D, publisher content 104E, member channels 104F through member channels 104G and registered members & publishers 104H.

Publisher reusable phone numbers 104A includes database and applications used to allocate the non-exclusive phone numbers for direct inward dialing (DID). Aspects of the present invention further index each non-exclusive phone number with a member phone number and the content to allow reuse of each non-exclusive number, hence a reusable phone number. The content provided from content publishing system 104 therefore depends not only on the reusable phone number referenced by each member of a publisher's network but also the member phone number registered with content publishing system 104. It is also possible for different members of the publisher's network to use different reusable phone numbers yet receive the same published content. Each of the various non-exclusive numbers are indexed by the respective member phone number and designated to receive the publisher's content. Further details regarding the scalability and flexibility of using reusable phone numbers is described in more detail later herein.

Alternatively, a publisher may indeed be allocated an exclusive phone number as provided by publisher exclusive phone numbers (DID) 104B. These exclusive phone numbers are assigned in advance to a publisher and used by members to access the corresponding published content. Publishers invite members to join their network using a permanently assigned exclusive phone number rather than the non-exclusive number or the reusable phone number as previously described. This allows exclusive inward phone numbers to be broadly advertised on television and other visual media. Each member accesses the publisher's content using the same exclusive number rather than a reusable number. There is no need to further index the exclusive number by the member's phone number as the exclusive number can only be associated with one publisher at a time.

Publisher destination profile 104C includes a database and applications allowing a publisher to tailor their content and its delivery to members. Templates and routines selected from publisher destination profile 104C for use by the publisher may depend on the publisher's target audience and use of the published content. For example, these templates may be configured to deliver digital music files to a member, present a selection of ringtones for purchase and download screen savers to be displayed on a wireless phone or computer device.

Multimodal Communication Interface 104D includes the drivers and conversion routines necessary for members to communicate not only through email or voice but also through SMS, MMS, HTTP, ICQ and other communication modalities. Different communication modes selected from the multimodal communication interface 104D can be mixed together depending on the communication capabilities of the devices used by the publisher and/or the member. For example, a member may request published content by sending a SMS message to the publishers yet the publisher may have preprogrammed the publisher destination profile 104C to respond to such requests by calling the member back on a phone using the member phone number.

Member channels 104F/G include databases and applications for indexing and tracking the use of reusable phone numbers and exclusive phone numbers by different members. These databases may be used to track whether a member has joined one or several different networks for published content and the information regarding these networks. For example, the data stored in the databases associated with member channels 104F/G ensures that the same member does not use the same reusable phone number in order to prevent a collision in the use of the underlying non-exclusive phone number. For example, the same member could not be assigned a non-exclusive phone number twice as it would not be possible to determine with certainty what published content has been requested. In addition, member channels 104F/G keep track of state information as members retrieve and potentially interact with published content in communication system 100. State information allows members to communicate over one or multiple modalities in content publishing system 104 performing complex communication, transactions and information gathering or polling events. For example, a member may initiate communication using an SMS mode on a wireless phone and then receive a response back from a publisher to participate in a poll over the voice channel.

Registered members and publishers 104H includes databases and applications for keeping track the various publishers and members in communication system 100. Aside from conventional personal information, the database associated with registered members and publishers 104H holds the member's phone number used to index a reusable phone number. Publisher's preference for using an exclusive phone number or reusable phone number (i.e., a non-exclusive number indexed by the member's phone number) is also kept track of in registered members and publishers 104H. Tools and applications also exist add, delete and modify members and publishers in communication system 100.

Multimodal switching equipment 106 includes a number of network devices and software for processing traffic. It is contemplated that different combinations of hardware, software and load balancers may be necessary to handle data traffic from the Internet, voice traffic from telephony network 108 or other locations. Accordingly, multimodal switching equipment 106 can be configured to handle traffic from different protocols or modalities including: voice telephonic access with voice recognition, telephonic access with touch-tone interaction, a short message service (SMS), a multimedia messaging service (MMS), an enhanced messaging service (EMS), an email and a web page submission. It is also contemplated that members and publishers can perform member functions or publisher functions at different stations. In the example in FIG. 1A, we illustrate that a laptop may be used as publisher station D 118 and wireless phone may also be used as a publisher station B 114. On occasion, it is also possible that a single device like a personal digital assistant (PDA) can operate as both publisher station E and member station C 120 as illustrated.

Figure 1B:
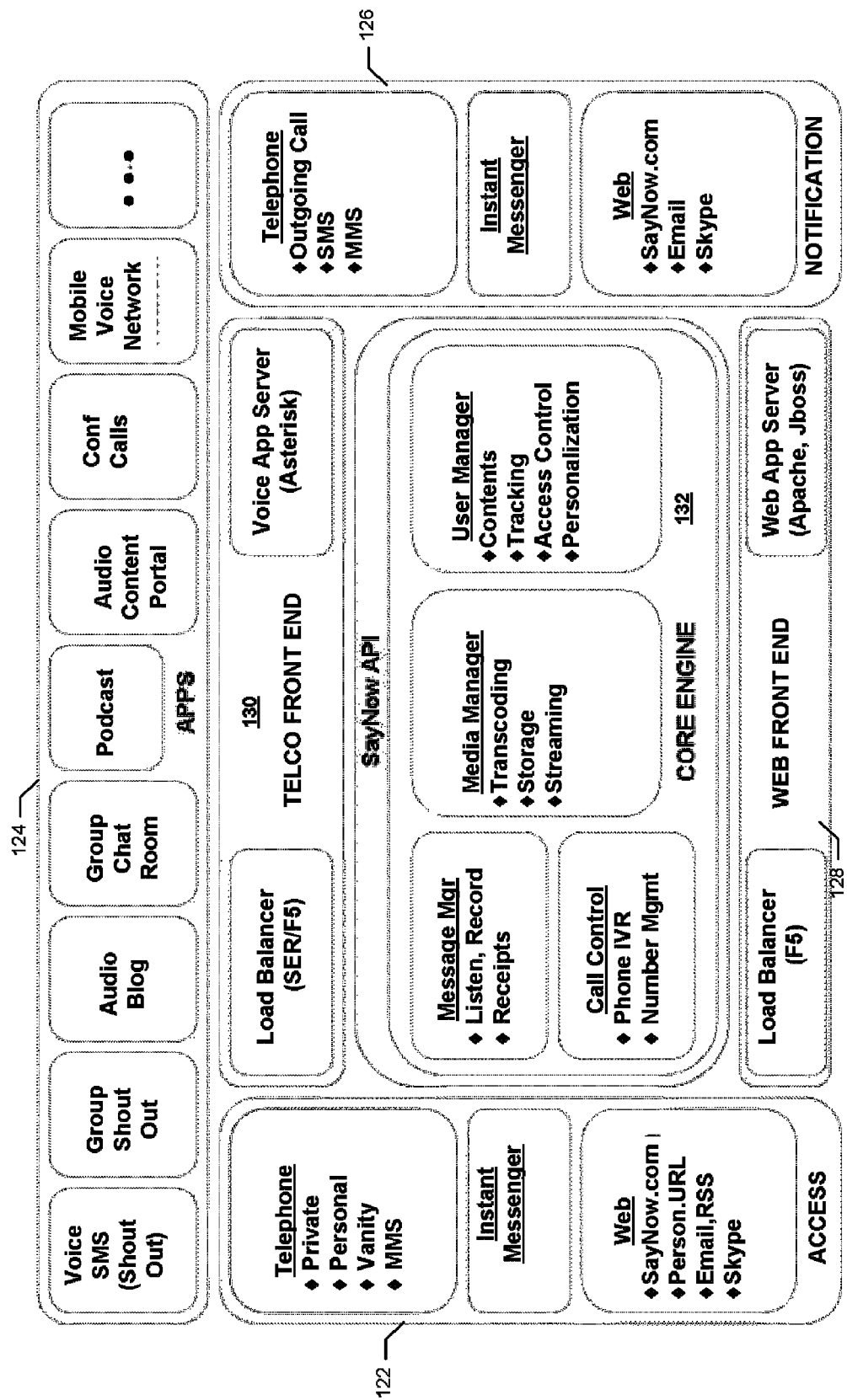
FIG. 1B provides another schematic organization of the systems used for operating content publishing system and communication system.

FIG. 1B provides another schematic organization of the systems used for operating content publishing system 104 and communication system 100. This system includes access modalities 122, applications 124, notification modalities 126, web front end 128, telco front end 130 and core engine 132. Access modalities 122 include various ways that a member can request published content from content publishing system 104 including using various interfaces available on the web, instant messenger/chat (ICQ) communications and a telephone. For example, requests for published content may include accessing a voice mail box setup by a publisher and configured to receive voice messages.

Notification modalities 124 concern the various modalities that a member can receive notification that a message has been left for them or they have been invited to join a publisher's network. It is also possible for notification modalities 124 to include the response to a request for published content or a reusable or exclusive phone number in the content publishing system 104. These modalities for receiving notification also include interfaces over the web, instant messenger and the telephone. On the telephone, notification modalities may include receipt of a short phone call to the member's phone thereby delivering the reusable or exclusive phone number through the caller-id capabilities of the phone. SMS messages can also be used as another notification modality that directly delivers the publisher's reusable or exclusive phone number to the member's SMS client on a wireless phone or other device.

Applications 124 provide a short list of various applications that can be created using various implementations of the present invention. Voice SMS applications allow a user to call and leave a voice message for a publisher or other member using a reusable or exclusive phone number. If the message is directed to a publisher then content publishing system 104 receiving the voice message immediately sends an SMS message notifying the publisher that a member has left them a message. The publisher then listens to the message and decides how to reply. If they want to send a reply, the content publishing system 104 holds the voice message in the system and then notifies the member that sent the original message that they have a reply from the publisher. The member can then retrieve the message from the content publishing system 104 without ever directly calling the publisher or other member. Variations of this interaction can be applied to the other applications 124 as described in further detail later herein.

Web front end 128 allows members to access applications 124 and other features of the communication network 100 through the Internet or intranet. This subsystem includes a load balancer to spread out the processing of interactions out over several servers and reduce latency/delay. Web application server in web front end 128 processes and delivers web pages providing access on the back end to core engine 132 and various applications 124. Telco front end 130 operates similarly except that it provides an interface accessible using a phone, the keypad of the phone, voice and potentially voice recognition delivered through a phone. The voice application server in telco front end 130 terminates and processes the phone calls while the load balancer distributes and evens out the processing as previously described.

The core engine 132 illustrated in FIG. 1B concerns the essential processing of voice and data using various implementations of the present invention. In this example, the core engine 132 includes a message manager, a call control subsystem, a media manager and a user manager for members.

Figure 2:
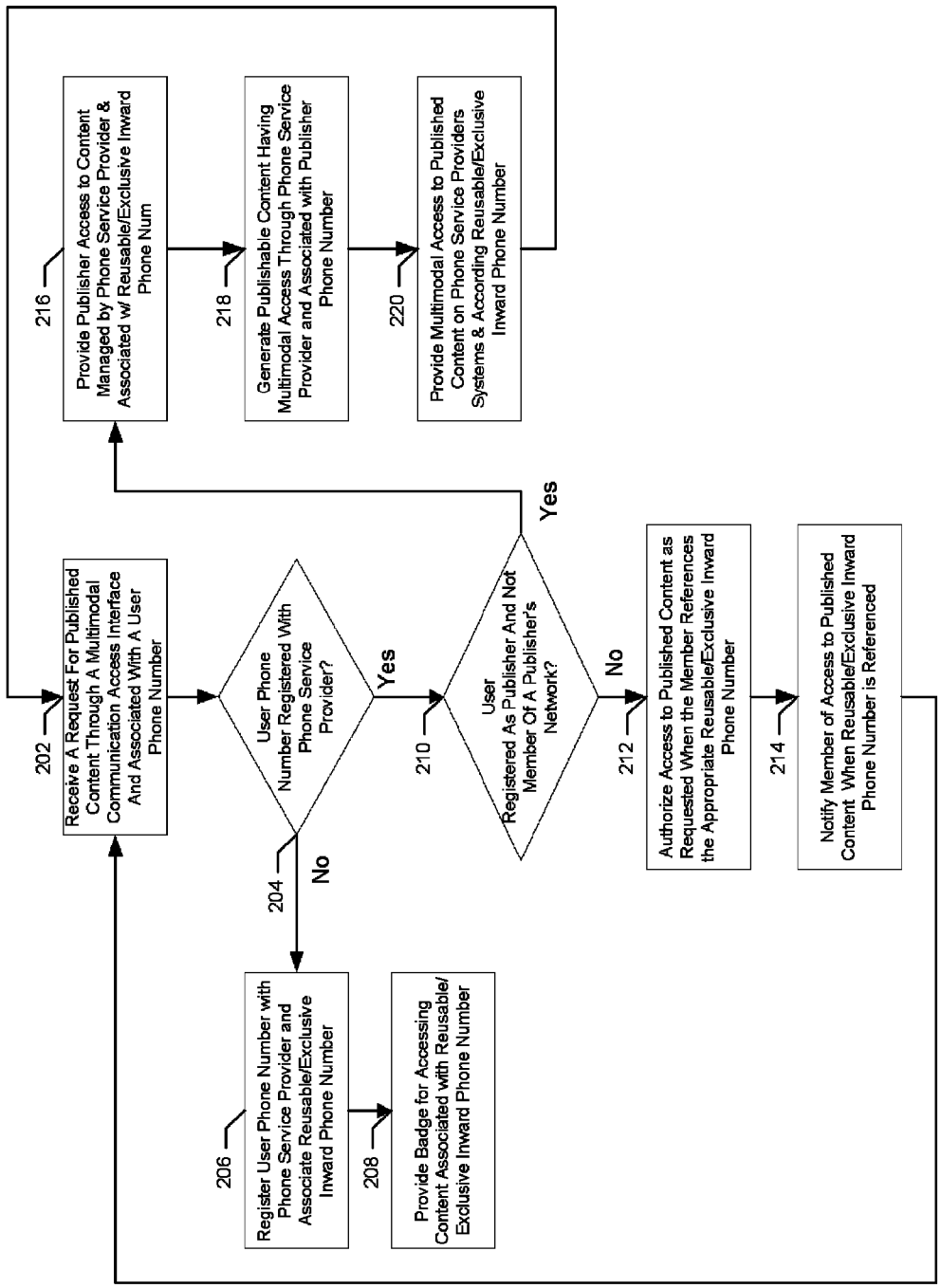
FIG. 2 is a flowchart diagram of the operations used to initiate communication over the communication network consistent with one implementation of the present invention.

FIG. 2 is a flowchart diagram of the operations used to initiate communication over the communication network consistent with one implementation of the present invention. A communication system initially receives a request for published content through a multimodal communication access interface and associated with a user phone number (202). In one implementation, the request is made by sending an SMS message to the PSP and content publishing system through an SMS message access interface. The user phone number may be provided inherently as part of the SMS message or other message from the wireless phone. For example, a user can call a reusable phone number or exclusive phone number for a publisher and their user phone number will generally be provided through the caller-id of the user's phone. Alternate implementations may also work with different access modalities interfacing with the multimodal communication access interface.

Next, the communication system determines if the user phone number has already been registered with the PSP (204). It must be determined if the user had already registered the user phone number in the communication network before the user is made a member of the publisher's network and access to the requested content granted. In the event the user phone had not been registered, the communication system registers the user phone number with the PSP and associates it with an inward phone number (206). The inward phone number may be either reusable phone number or an exclusive phone number as previously described. The PSP also associates either the reusable phone number or the exclusive phone number with the requested content. Optionally, a 'badge' for requesting access to the published content may also be provided to the user registering with the PSP (208). The clickable badge may be a link on a user's web page advertising the availability of the published content or included in an HTML enabled email as a link to the published content. For example, a rock band may publish their music and lyrics through the PSP and advertise its availability by emailing the badge to all the members of their fan club or placing the badge on their website.

It is also feasible that user was already registered with the PSP (204—Yes) and has requested to either receive published content as a member or allowed to edit/modify or generated the published content. Accordingly, the communication system also determines if the user registered as a publisher of content or a member of a publisher's network (210). In one implementation, the communication system may check if the user registered their phone number as a publisher phone number or a user phone number to determine their role. The user is classified as either a member of a publisher's network or a publisher of content.

If the user is considered a member, the communication system authorizes access to published content as requested when the member references the appropriate inward phone number (212). In one implementation, the user references an exclusive inward phone number directly associated with the content requested. Alternatively, the user may reference a reusable inward phone number that combines a non-exclusive phone number with the members phone number to gain access to the published content. Either way, the communication system then notifies the member of access to the published content when the reusable or exclusive inward phone number is referenced (214). For example, the notification can be made by sending an SMS message through the multimodal communication access interface of the communication system and onto the SMS client in the wireless communication device.

Alternatively, if the user is considered or classified as a publisher then the communication system provides the publisher access to the content managed by the PSP and associated with either a reusable or exclusive inward phone number (216). For example, the publisher should be able to readily access and modify the content managed by the PSP. Additionally, the publisher may also generate more content to be published and available through the PSP (218). For example, the publisher may setup voicemail content, interactive polls for members to participate and also may offer ringtones/screensavers/music for purchase. The communication system also provides multimodal access to the published content on the PSP in accordance with the reusable or exclusive inward phone number (220). This feature allows the publisher to specify different ways for members of their network to interact with their content. For example, members may send SMS messages and receive phone calls in return or may submit phone call requests and receive MMS messages in response. Essentially, the publisher may specify a variety of different communication interactions using a combination of messages and requests submitted using a phone, SMS messages, MMS messages, Instant Messenger/Chat (ICQ) and other communication modalities.

Figure 3:
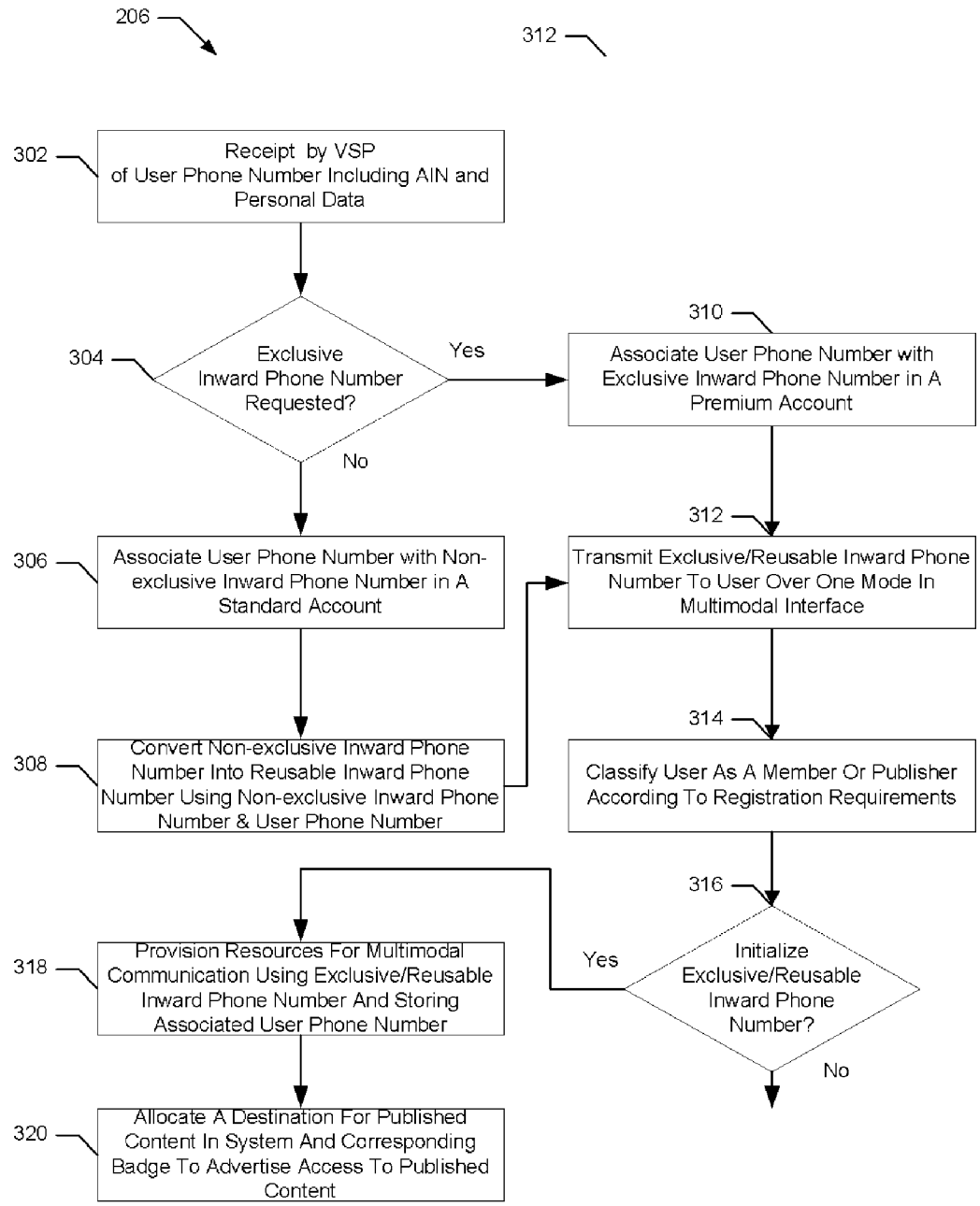
FIG. 3 illustrates a flowchart for registering a user with the PSP and communication network consistent with one implementation of the present invention.

FIG. 3 illustrates a flowchart for registering a user with the PSP and communication network consistent with one implementation of the present invention. The PSP initially receives a user phone number and may include Advanced Intelligent Network (AIN) information and personal data on the user (302). Depending on the configuration, the PSP determines if the user should receive an exclusive inward phone number rather than a non-exclusive inward phone number to fulfill the request (304) (Yes—branch). If an exclusive phone number is appropriate then the user phone number is associated with an exclusive inward phone number in a premium account (310). The exclusive inward phone number may have a premium fee associated with it as it can only be used by one publisher and cannot be shared. It also has the advantage of not changing over time thus allowing the publisher to advertise the same exclusive phone number to all of the members of the publisher's network.

Alternatively, the PSP may determine that the user should receive a non-exclusive inward phone number instead (304) (No—branch). A non-exclusive inward phone number can be shared by several publishers and thus may have a reduced cost or charge for its use (306). In accordance with aspects of the present invention, the same non-exclusive phone number may be reused by different publishers at the same time yet will provide different published content to members of their respective networks. The PSP converts the non-exclusive inward phone number into a reusable phone number using a combination of the non-exclusive inward phone number and the user phone number as registered (308). In one implementation, the user phone number operates as an index to the non-exclusive inward phone number and is associated with the publisher and/or the published content. For example, a phone call made to the non-exclusive inward phone number cannot reference published content or a publisher's network unless the user's phone number is also provided.

In either of the above scenarios, the exclusive or reusable inward phone number is transmitted to the user through a multimodal interface options available through the PSP (312). In some cases, the exclusive or reusable inward phone number is transmitted through a phone call placed back to the user. Alternatively, the exclusive inward phone number is sent as a text message using SMS, MMS, chat/Instant Messenger (ICQ) or other similar service. As a result, the exclusive or reusable inward phone number is allocated and provided to the user for subsequent usage.

The PSP and communication network then classifies the user and the user phone number as being either a member or publisher in the system (314). Publisher's are given authority to publish content and setup networks of members in addition to having access to their own published content. For example, a member of a rock band or their manager may register as a publisher on the system and publish music, videos and concert information over the communication network and to the PSP. Fans of the rock band my register as members of the rock band's network of members in order to receive up-to-date information on concerts, videos, music and other benefits.

Once the user is registered as either a member of publisher, the PSP may perform an initialization of the exclusive or reusable inward phone number on the system (316) (Yes—branch). Generally, the exclusive or reusable inward phone number is setup when the publisher of the content first registers. The initialization includes provisioning resources for multimodal communications using the exclusive or reusable inward phone number and storing the associated user phone number (318). If storage for the published content is required then the PSP also allocates a destination or storage area for published content in the system and also provides a 'badge' for advertising (320). The 'badge' can be a link for the publisher or members to place on their website or include in emails to advertise their business or club to others.

Figure 4:
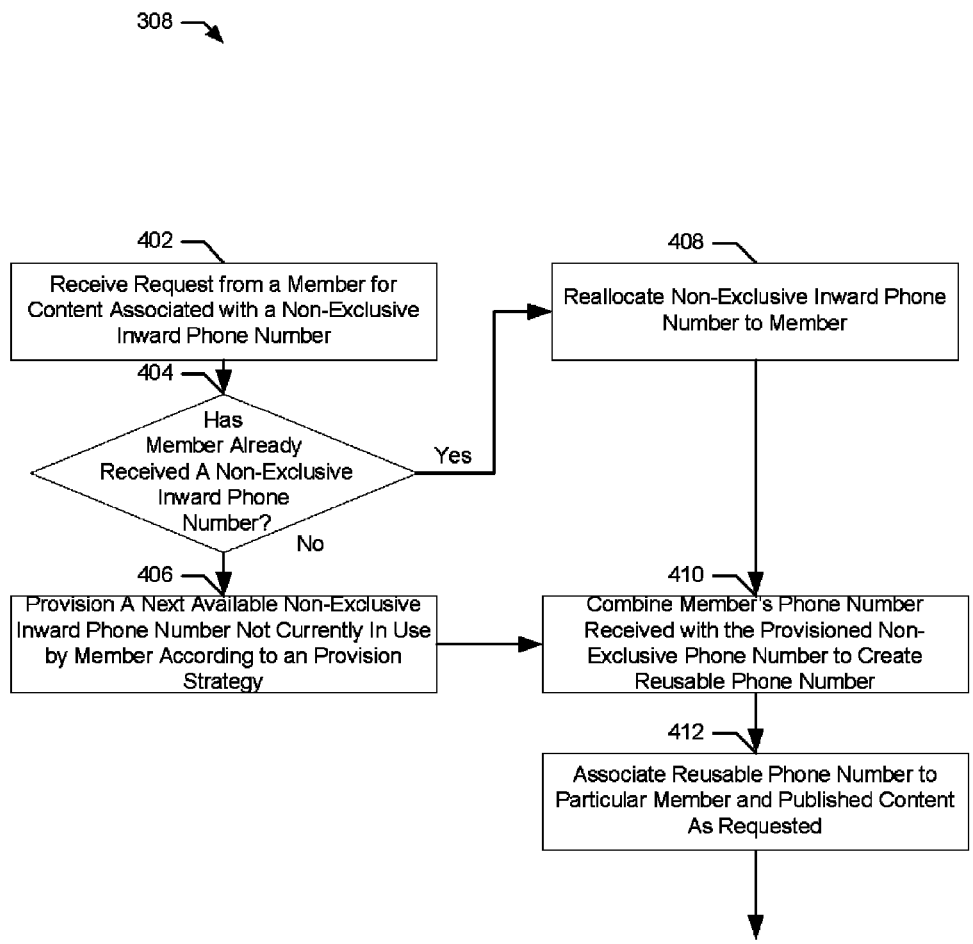
FIG. 4 is a flowchart diagram detailing the operations needed to generate a reusable inward phone number in accordance with one implementation of the present invention.

FIG. 4 is a flowchart diagram detailing the operations needed to generate a reusable inward phone number in accordance with one implementation of the present invention. Instead of allocating or provisioning a permanent and exclusive inward phone number, the reusable inward phone number can be generated on demand for each member requesting the published content.

Accordingly, the PSP and communications network receives a request from a member for published content associated with a non-exclusive inward phone number (402). It is contemplated that the member generally requests published content using a 'badge' or other link to the published content since the inward phone number is not known in advance. The use of the non-exclusive inward phone number is determined according to the registration made by the publisher and is transparent to the member making the request.

Next, the PSP and communication network determine if the member has already received a non-exclusive inward phone number to retrieve the published content (404). In the event the member already received a non-exclusive phone number (404) (Yes—branch) then the PSP and communication network reallocates the same non-exclusive inward phone number to the member, if it is available (408). For example, the member may have joined the publisher's network previously and already received published content using the non-exclusive inward phone number.

Alternatively, if a non-exclusive inward phone number has not been allocated then the PSP and communication network provisions a next available non-exclusive inward phone number not currently in use by the member according to a provision strategy (406). In one implementation, the non-exclusive inward phone numbers are allocated in numerical sequence as members make requests for published content. Yet another provision strategy considers the locale of the member making the request to determine the non-exclusive phone number. For example, a member making a request from Los Angeles, Calif. may receive a non-exclusive inward phone number having an area code and phone number from Los Angeles Calif. This strategy has advantages for the member since they do not have to make a long-distance call to use the system. Also, this strategy is advantageous to the publisher since it will appear to each member that the publisher has a presence and/or are based in the city and state that they live in.

The reusable phone number is created by combining the member phone number with the provisioned non-exclusive inward phone number and the content (410). For example, the combination can be done using a mathematical hashing function that combines both the member's phone number and the non-exclusive phone number together to create an index. Eventually, the PSP associates the reusable phone number and index with the member and published content they have requested (412).

Figure 5:
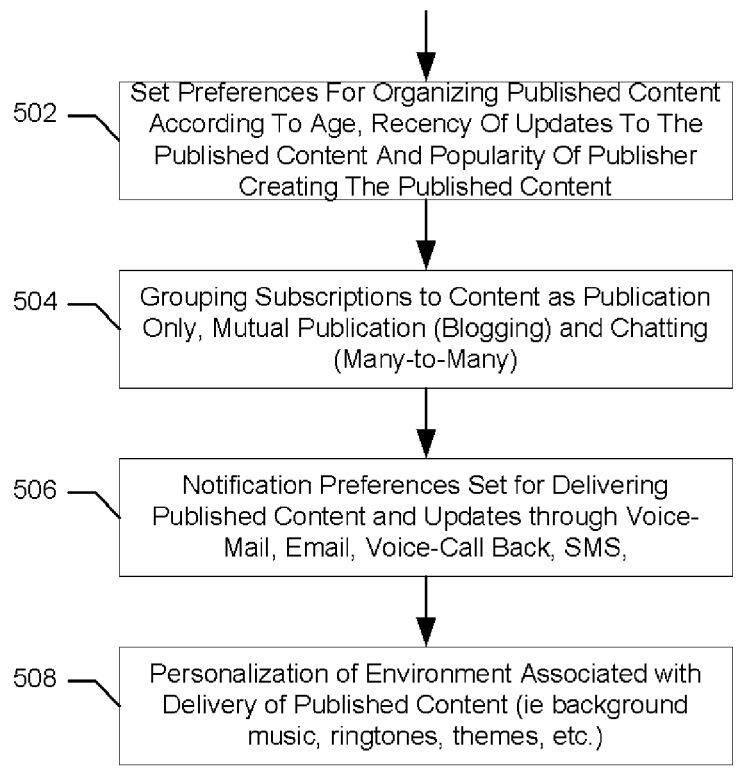
FIG. 5 illustrates yet another flowchart of the operations for a member to set preferences when accessing content over the communication network in accordance with one aspect of the present invention.

FIG. 5 illustrates yet another flowchart of the operations for a member to set preferences when accessing content over the communication network in accordance with one aspect of the present invention. Members may join many networks setup by different publishers and therefore need to organize the published content as well as manage the communication modes used in the communication network. In one implementation, the member may decide to organize the published content they receive based on the age of the content, the age of the most recent updates to the content or many other parameters (502). Essentially, the published content is organized in a manner most suitable to the member or members receiving the information.

Members can also organize content according to the communication based on how the published content is organized (504). Members may organize content as being publication only, mutual publication (blogging) and chatting publications (many-to-many). For example, aspects of the present invention allows a publisher to post published content and also allows members to then comment on the published content. Members can comment on the published content or other topics with the publisher and other members through blogging or chatting applications made available through the PSP and communication network.

Further preference settings allow members to indicate notification preferences for delivered content and updates (506). The multimodal communication access interface in the communication network may allow notification through voicemail, email, voice-call back, SMS, EMS, MMS and Instant Messenger/Chat (ICQ). Preference settings in the member profile allows each member to specify a preferred method or priority of receiving notifications according to the devices they own and their capabilities. Members may also personalize an environment for receiving published content according to their personal preferences (508). For example, a member may specify a background music to receive certain voice mail, an association of a certain ringtone with the receipt of certain published content and other themes to provide personalization.

Figure 6:
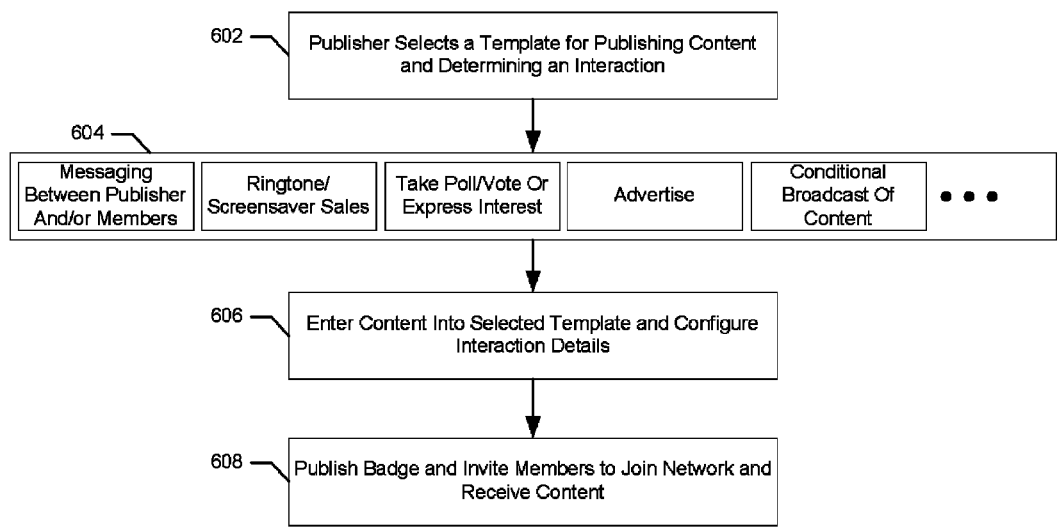
FIG. 6 is a schematic of the operations for publishing content in accordance with aspects of the present invention.

FIG. 6 is a schematic of the operations for publishing content in accordance with aspects of the present invention. To streamline the publishing operation, a publisher is provided a palette of templates for publishing content and determining interactions (602). Flexible templates are used to assist the publisher with the publishing content and reducing the amount of customization. Templates are designed to address the most typical types of publications and requested interactions. If the publisher has further requirements, the templates can optionally be customized as needed to address special needs and functions.

In one implementation the templates provided to the publisher include (604): messaging between publisher and/or members, ringtone/screensaver sales, take poll/vote or express interest, advertising and conditional broadcast of content. The messaging template provides an infrastructure for the publisher to post content and the members to then discuss with each other and/or the publisher. This can be configured as a publication only, mutual publication (blogging) and/or chatting (many-to-many).

Another template enables the publisher to sell ringtone/screensaves and other digital items. The publisher may sell ringtones/screensavers or other digital items directly to members of their network through or allow a third part to process the actual downloading and installation. It is also possible for the publisher to create an interactive poll or voting using aspects of the present invention. As will be described later herein, the members can request to take part in a poll and then the template will initiate a one-on-one survey or poll with the member using a combination of text messaging, voice-prompts and/or web based interactions. Templates can also be provided to insert advertisements in appropriate places within certain published content or between natural divisions of content being published. For example, advertisements may be inserted between messages or songs published for members of a publisher's network. Conditional broadcast of content allows a publisher to create content in advance but only publish upon occurrence of a certain event or condition. For example, members of a publisher's network may receive notice that an outdoor rock concert has been cancelled and rescheduled conditioned upon the occurrence of rain in the city or area of the venue.

Once the template has been selected, the publisher enters the contents into the selected template and configures interaction details (606). This may include the price to be paid for certain ringtones or background colors to be displayed on images associated with the content. To invite members to join his network, the publisher transmits a badge and invites other members to join his network and receive the newly created content (608). The badge can be sent through emails, published on a website or potentially sent through multimedia enabled chat rooms, MMS or SMS clients.

Figure 7:
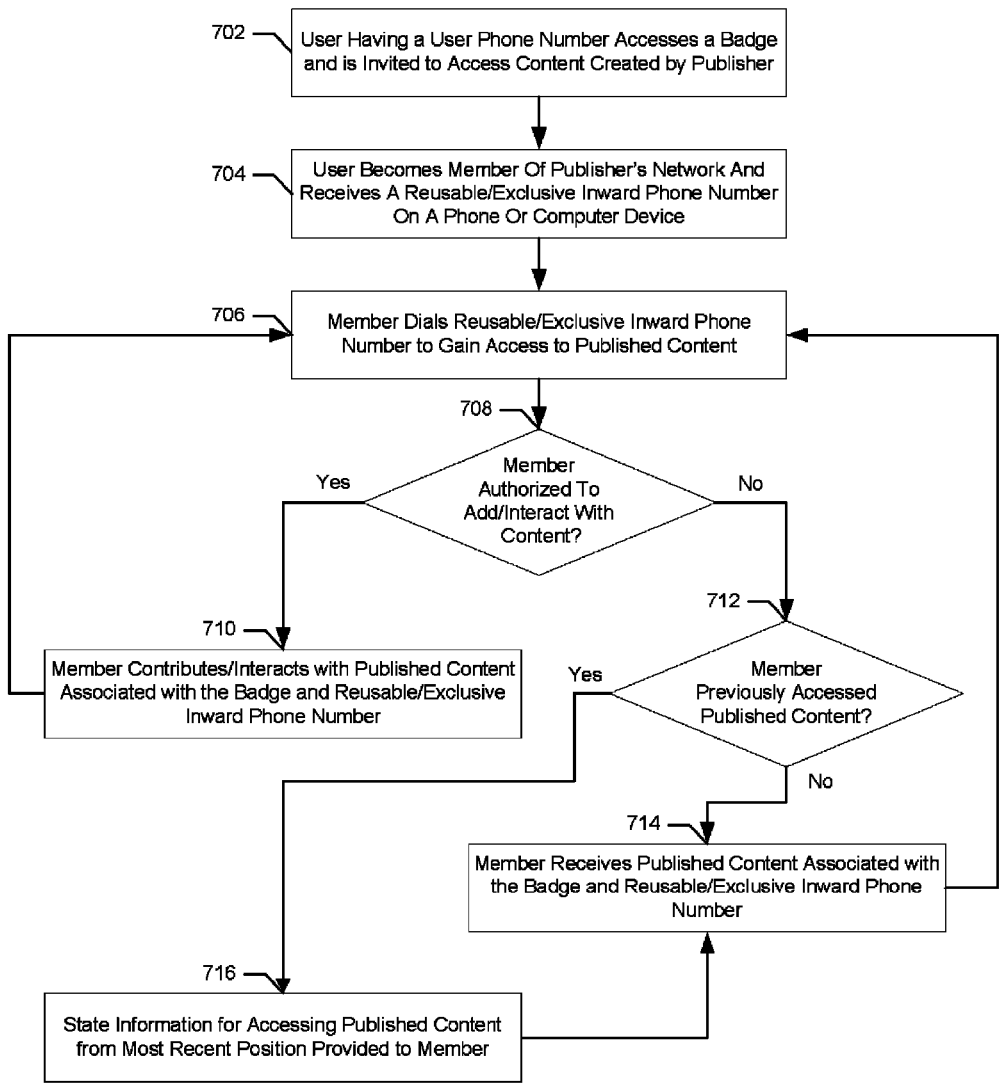
FIG. 7 illustrates operations performed when a member accesses published content according to one implementation of the present invention.

FIG. 7 illustrates operations performed when a member accesses published content according to one implementation of the present invention. In one implementation, the user is invited to access published content by accessing a badge associated with the content created by a publisher (702). Content can be static audio or image information or can be complex interaction-driven applications designed and setup by the publisher as previously described. If the user has not done so already, the user registers on the system and receives either a reusable inward phone number or an exclusive inward phone number on a phone, computer or other device (702). The publisher's configuration generally determines if a reusable inward phone number or exclusive phone number will be used.

Upon successful registration, the user becomes a member of the publisher's network and is given access to the published content. For example, the member may receive a text message over an SMS, MMS or Instant Messenger/chat (ICQ) channel specifying the reusable or exclusive inward phone number to gain access to the published content (704). Next, the member dials the reusable/exclusive inward phone number and access the published content (706). The system determines if the member is authorized to contribute or interact with the content (708) depending on the member's status and the type of content that has been published.

If the content is interactive and the member has authorization (708) (Yes branch) then the member may contribute and/or interact with the published content associated with the badge and the reusable or exclusive inward phone number (710). For example, interactive content may include applications designed take polls from members of the publisher's network, sell ringtones/screensavers or other digital data to the members or allow the members to chat with each other or the publisher in a chat room or other interactive forum.

Interactive applications may allow members of a publisher's network to create a social community by interacting not only with the publisher but with each other. For example, one member may leave another member a message or comment concerning the content provided by the publisher. Members may allow or disallow other members to leave messages. Publishers may also allow or block certain members from leaving messages. If necessary, the publisher may also moderate the membership in the network and ask certain members to leave if they do not behave in an acceptable manner.

Alternatively, if the content is not interactive or the member is not authorized (708) (No branch) then the user may access but not contribute to the published content. It is contemplated that members may have previously accessed certain published content and want to continue where they most recently left off (712) (Yes branch). Accordingly, the system may keep state information for accessing published content from the most recent position provided to member (716). For example, a member may listen to a portion of a blog published by a politician and continue listening to the blog at a later time without starting over. The member may also access the published content for the first time and not require state information (714) (No branch). In either case, the member receives the published content associated with the badge and the reusable/exclusive inward phone number as requested (714).

Figure 8:
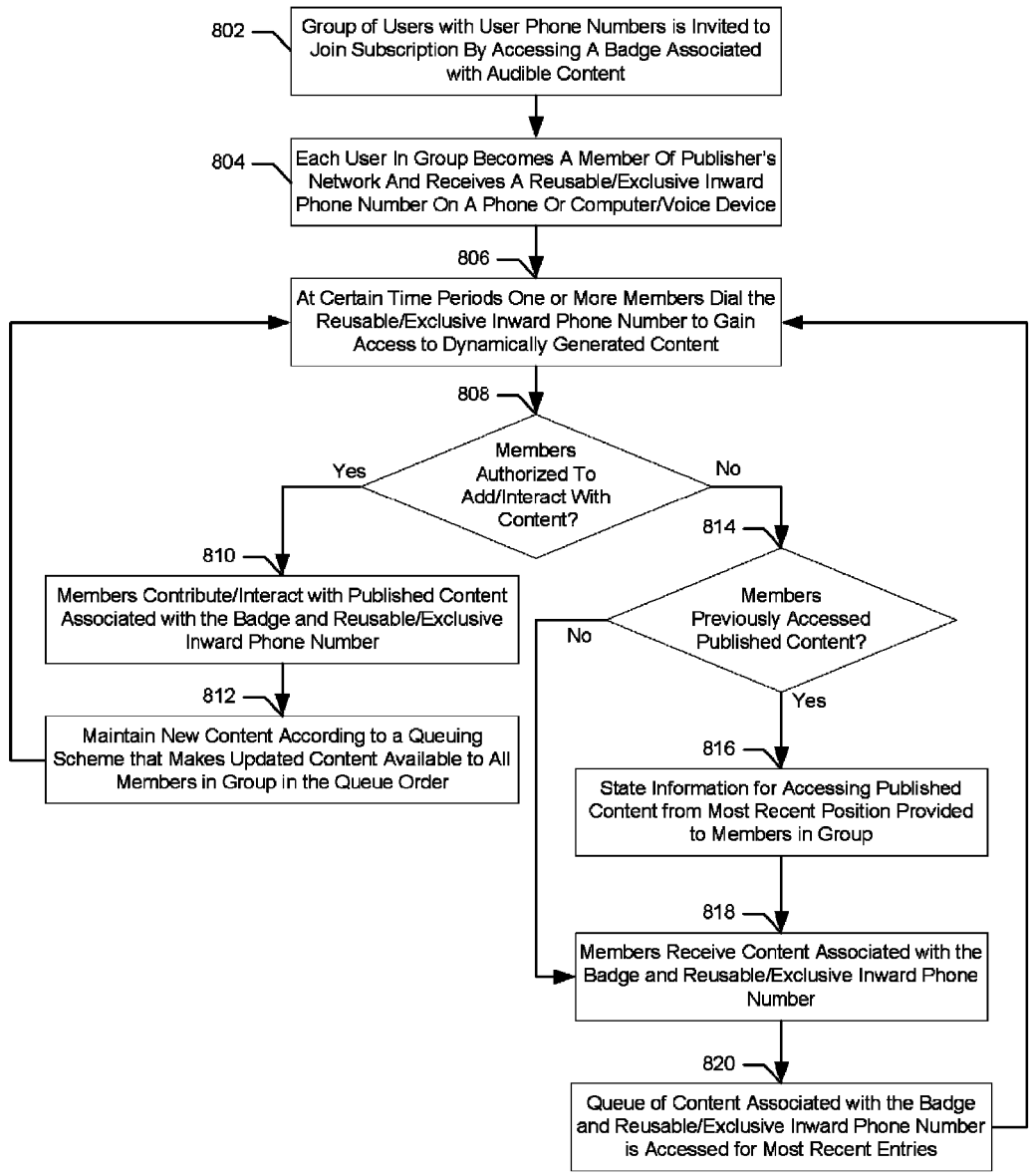
FIG. 8 illustrates operations performed when a group of members access the published content according to one implementation of the present invention.

FIG. 8 illustrates operations performed when a group of members access the published content according to one implementation of the present invention. Many of the operations outlined in FIG. 7 are similar but now they apply to multiple members. Accordingly, a group of users are invited to access published content by accessing a badge associated with the content created by a publisher (802).

Upon successful registration, each user in the group becomes a member of the publisher's network and is given access to the published content. For example, each member may receive a text message over an SMS, MMS or Instant Messenger/chat (ICQ) channel specifying the reusable or exclusive inward phone number to gain access to the published content (804). At certain time periods, one or more members dial the reusable/exclusive inward phone number and access the dynamically generated content (806). The system determines which members, if any, are authorized to contribute or interact with the content (808) depending on each member's status and the type of content that has been published.

If the content is interactive and the members have authorization (808) (Yes branch) then each member may contribute and/or interact with the published content associated with the badge and the reusable or exclusive inward phone number (810). For example, interactive content may include applications designed take polls from members of the publisher's network, sell ringtones/screensavers or other digital data to the members or allow the members to chat with each other or the publisher in a chat room or other interactive forum. It can also be used to hold a real-time interactive meeting among members of a group. To keep the communications in order, the system also maintains a queueing scheme that makes the updated or added content available to all members of the group in queue order (812). For example, comments added to the content will be received by other members of the network in the order they are presented or a first-in-first-out (FIFO) sequence.

As previously described, interactive applications may allow members of a publisher's network to create a social community by interacting not only with the publisher but with each other. In a group of members, multiple members may leave messages or comments for the group of members or privately for individual members. Either the group of members or individual members may allow or disallow other members to leave messages. Publishers may moderate these groups of members allowing or disallowing some members from leaving messages or adding content. They also may moderate the membership in the network and ask certain members to leave if they do not behave in an acceptable manner.

Alternatively, if the content is not interactive or the members are not authorized (808) (No branch) then members may access but not contribute to the published content. It is contemplated that members may have previously accessed certain published content and want to continue where they most recently left off (814) (Yes branch). Accordingly, the system may keep state information for accessing published content from the most recent position for multiple members of the group (816). Members may also access the published content for the first time and not require state information (814) (No branch). In either case, the member receives the published content associated with the badge and the reusable/exclusive inward phone number as requested (818). Because some of the content may be generated dynamically by other members, the system also maintains a queue of content associated with the badge and the reusable or exclusive inward phone number (820). In one implementation, this queue provides the dynamically generated content in FIFO sequence or order to the members.

Figure 9:
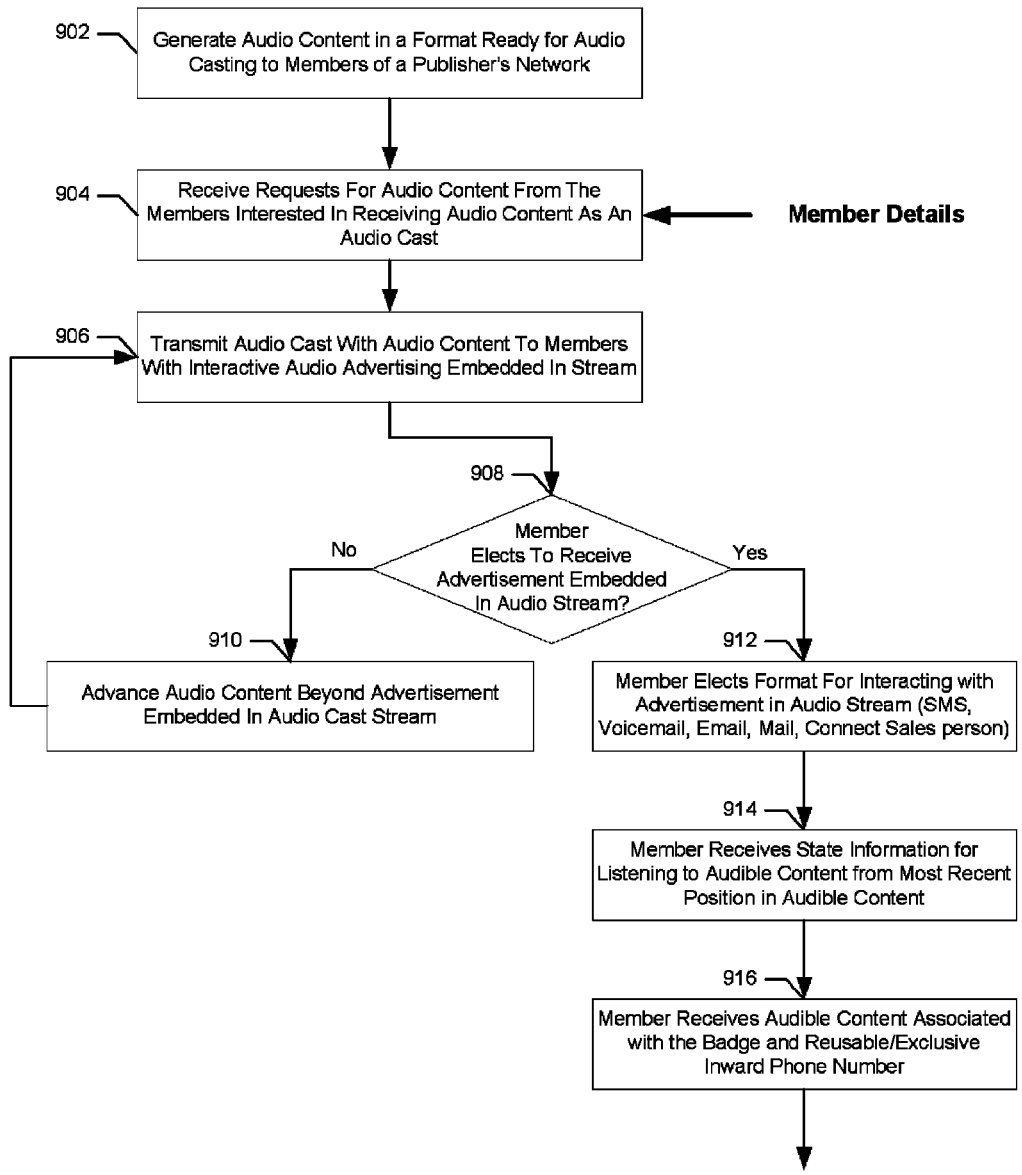
FIG. 9 illustrates operations performed by an application designed to audio cast audio content to members of a publisher's network according to one implementation of the present invention.

FIG. 9 illustrates operations performed by an application designed to audio cast audio content to members of a publisher's network according to one implementation of the present invention. The set of operations in FIG. 9 allow audio advertising to be interactively embedded in a stream of audio content provided by the publisher. It is contemplated that a similar set of operations could also be applied to embedding a stream of audio and/or visual advertisements in video content as well.

In this example, a publisher generates audio content in a format ready for audio casting to members of the publisher's network (902). For example, the publisher may be the promoter of a rock band providing members of the fan club samples of an upcoming release. Once the content is generated and published, the system will receive requests for the audio content from the members interested in receiving the audio content as an audio cast (904).

To identify the most appropriate advertising, the system gathers details on each member requesting the audio content and selects advertisements most suitable to the individual. For example, younger members of the publisher's network may receive advertisements concerning a certain style of clothes suitable for teenagers while older members of the publisher's network may receive advertisements concerning home loans or financial planning. In either case, these advertisements are embedded in the audio content and tailored to the individual members. The system transmits the audio content with interactive audio advertising embedded in the stream to the particular members of the network (906). It is contemplated that an insertion fee is charged back to one or more parties associated with the advertisements inserted or embedded in the audio content. Likewise, members that opt to receive the advertisement may receive a portion of the insertion fee in the form of a discount for services or a credit for future purchases of services. For example, the fee amount may be increased if there is a high correlation between a set of objective criteria setup in advance and the particular details of the members. A decreased insertion fee may result from a reduced or decreased correlation between the set of objective criteria and the particular details of the member. Generally, insertion fees may also vary depending upon the correlation between a targeted demographic audience and the one or more details presented and associated with a real audience. For example, the targeted demographic audience may include males living in Paris, France and having an income in the top quartile of the population within their specified geographic area.

During playback of the audio content, a member may decide to opt-out or not receive advertisements embedded in the audio stream (908) (No branch). This causes an advance in the audio content beyond the advertisement. If the member elects to receive the advertisement embedded in the audio stream (908) (Yes branch) then the advertisement is not skipped over. Instead, the member selects a format for receiving and interacting with the advertisement embedded in the audio stream (912). For example, the interaction may take place using SMS, voicemail, email, mail or by connecting to a live sales person through a voice channel. These formats and protocols for audio content may include: PodCast, Mpeg and Mp3.

State information is saved to keep track of the member's position in the audio content and allow continued playback of the audio content subsequent to providing the advertisement. In one implementation, the member actively interacts with the advertisement and may request additional information regarding the advertised service or product as well as provide more personal information as may be required. To create an interactive advertisement, the system processing the advertisement establishes an interactive session for each of the one or more advertisements embedded in the audio content. This may included creating a separate voice channel to allow a sales person to contact the member and provide information or offers to purchase an item or service.

It may also include establishing a data channel for gathering information from the member like credit card information and providing access to a service or product. For example, a user may receive audio content having a song from their favorite musician along with an embedded advertisement to purchase one or more ringtones from their favorite musician. The member can then selectively purchase one or more ringtones from the interactive advertisement using touch-tone DTMF signals from a phone or through the use of voice recognition technology and audio advertisement prompting the member for selecting the ringtones. In either these or other approaches, a commercial transaction requiring payment for these products and services can be achieved using touch-tone DTMF signals, voice recognition techniques and other methods of interaction. Alternatively, another implementation provides a static audio advertisement that the member can listen to but cannot actively interact with to immediately engage in a commercial transaction. It is contemplated that these static audio advertisements may be used to lead the member to access one or more Internet links or other audio advertisements to complete a commercial transaction at a later time.

Once the advertisement has completed, the member may receive state information to continue listening to the audible content form the most recent position in the audio stream prior to the advertisement (914). The member then continues to receive the audible content from the publisher as the member had requested. (916)

Figure 10:
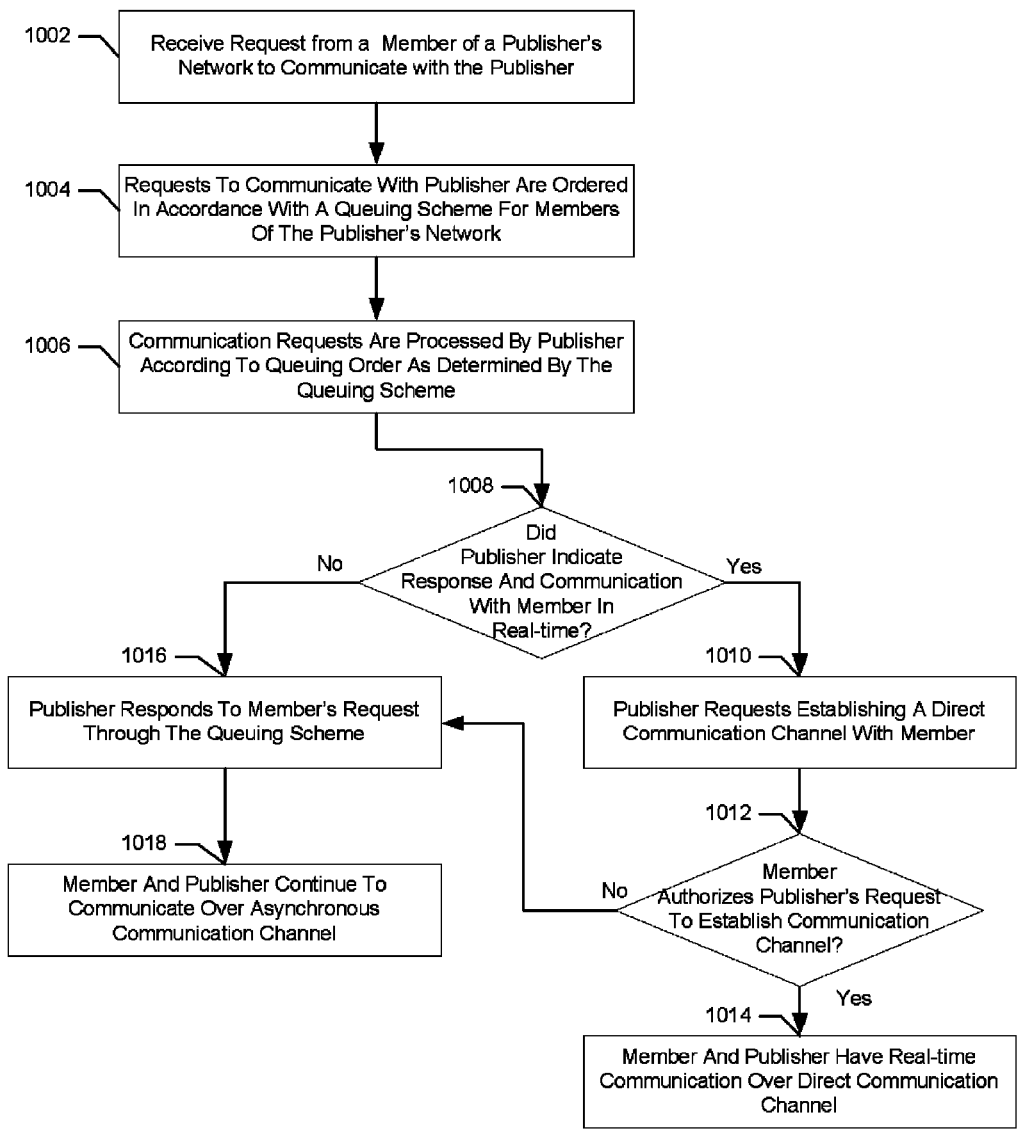
FIG. 10 is a flowchart diagram providing the operations for communicating synchronously and asynchronously in accordance with one implementation of the present invention.

FIG. 10 is a flowchart diagram of the operations used for communicating synchronously and asynchronously in accordance with one implementation of the present invention. One aspect of the present invention receives a request from a member of a publisher's network to communicate with the publisher (1002). This communication request may be through a voice message, an SMS message, an email or other types of communication. For example, a member may place a call to the publisher using an inward phone number configured as a reusable phone number, an exclusive phone number or a non-exclusive phone number as previously described.

To keep multiple members from contacting the publisher simultaneously, the publisher may select to receive calls asynchronously over either an exclusive, non-exclusive or reusable phone number. In one implementation, each of the member's requests are put in order or sequenced according to a queuing scheme that serializes the request with other requests from other members of the publisher's network in a first-come-first serve (FIFO) or other type of queuing scheme (1004).

The publisher then receives and processes the requests according to the selected queuing scheme setup in the system (1006). In processing each request, the publisher can decide how to reply based upon one or more factors associated with the member, the request or other factors. In one implementation, the publisher may consider the reputation of a member in the publisher's network in comparison to other members in the publisher's network. In addition, the publisher may also measure the activity of the member in the publisher's network in relationship to posting information, sending emails, contributing time to activities associated with the publisher. Further, the publisher may also evaluate a popularity and suitability of the subject matter to determine if it is more suitable for the response to the request be made over the direct communication and not through a queuing system methodology. For example, a musician may want to reply directly to a request made by very loyal fan in the musician's fan club who also posts losts of information on concert tours and other events in their blog or other area in a fan club.

Depending on how the aforementioned factors are considered, the publisher may indicate that they want to respond to the request in real-time over a synchronous interactive communication channel or an asynchronous communication channel (1008). In the latter case, the publisher may decide to respond with a voice message and then send it back to the member using the queuing scheme previously described (1016). For example, the response from the publisher may also occur according to a queuing scheme that serializes the response to the request along with other responses to one or more other requests over an asynchronous communication channel. These response may be made leaving voicemail, through SMS messages or even voicemail contained within an email message. In general, the member and the publisher may continue to communication over an asynchronous communication scheme for the remaining period of time that they communicate (1018).

Alternatively, the publisher may also decide that the factors instead warrant responding to the request over a direct interactive channel of communication instead (1008). For example, the publisher may establish the synchronous interactive communication channel thereby circumventing the queuing scheme and delivering a response to the request directly to the member of the publisher's network who made the request (1010). For example, the publisher may generate a signal associated with a predetermined key on a telephone keypad causing subsequent communication with the member to take place using a direct channel either over a plain-old-telephone system (POTS), a wireless communication device, and/or a wireless multimedia communication device and any other type of device for voice communication.

If the member authorizes, the publisher may then establish a communication channel directly with the member, such as over a telephone or a wireless communication device. (1012). Once established, the member and publisher are able to have real-time converastaion or communication over the direct communication channel (1014) rather than through a queuing system methodology.

Figure 11:
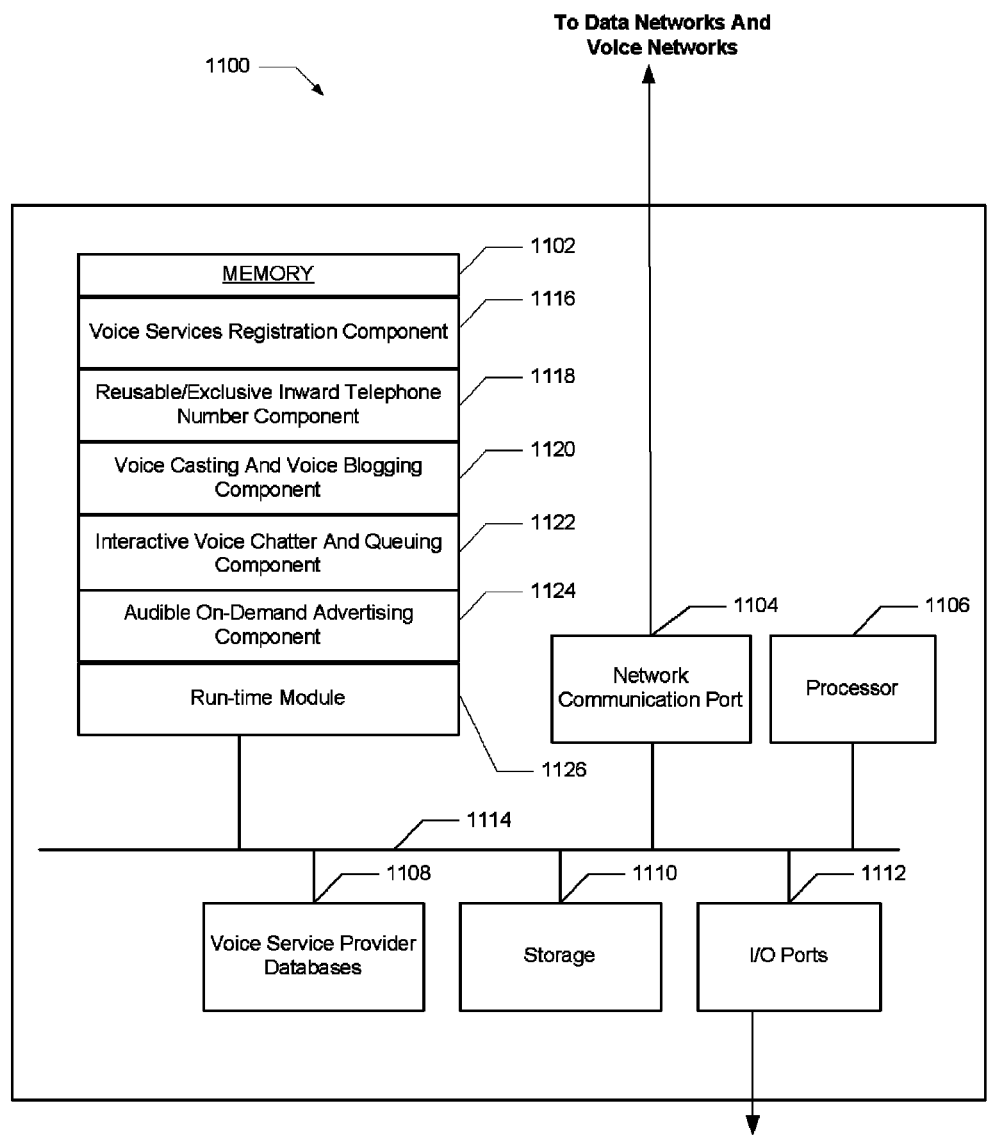
FIG. 11 illustrates a schematic of a system implementing aspects of the present invention.

FIG. 11 illustrates a schematic of a system implementing aspects of the present invention. System 1100 includes a memory 1102 to hold executing programs (typically random access memory (RAM) or read-only memory (ROM) such as a flash ROM), a network communication port 1104 for data communication, a processor 1106, Phone Service Provider (PSP) databases 1108, storage 1110 and I/O ports 1112 for connecting to peripheral devices all operatively coupled together over an interconnect 1114. System 1100 can be preprogrammed, in ROM, for example, using field-programmable gate array (FPGA) technology or it can be programmed (and reprogrammed) by loading a program from another source (for example, from a floppy disk, a CD-ROM, or another computer). Also, system 1100 can be implemented using customized application specific integrated circuits (ASICs).

In various implementations of the present invention, memory 1102 holds a Services Registration Component 1116, a Reusable/Exclusive Inward Telephone Number Component 1118, a Voice Casting and Voice Blogging Component 1120, Interactive Voice Chatter and Queuing Component 1122, an Audible On-Demand Advertising Component 1124 and a run-time component 1126 for managing one or more of the above and other resources.

Services Registration Component 1116 process and registers both members and publishers in the communication network as previously described. Reusable/Exclusive Inward Telephone Number Component 1118 provisions both non-exclusive and exclusive inward phone numbers as previously described and also converts the non-exclusive inward phone numbers to a reusable phone number. Voice Casting and Voice Blogging Component 1120 allows publishers to publish both these types of content for members of their network to receive in accordance with aspects of the present invention. Similarly, Interactive Voice Chatter and Queuing Component 1122 allows members and publishers to communicate together in a moderated manner using a queue to keep the messages in order and accessible. Audible On-Demand Advertising Component 1124 provides a mechanism for creating embedded advertising in audible content tailored to individual or groups of members.

Implementations of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs.

While specific embodiments have been described herein for the purposes of illustration, various modifications may be made without departing from the spirit and scope of the invention. Thus, the invention is not limited to the specific embodiments described and illustrated above but instead is defined by the appended claims in light of their full scope of equivalents.

What is claimed is:

1. A communication method for selective transmission of messages between a publisher and one or more members of a publisher's network, comprising:
   receiving a request from a member of the publisher's network to communicate with the publisher;
   ordering the request to communicate from the member of the publisher's network according to a queuing scheme that serializes the request with other requests from one or more other members of the publisher's network;
   determining if a response to the request from the member should be made through a synchronous interactive communication channel rather than the queuing scheme and an asynchronous communication channel;
   ordering a response from the publisher responsive to the determination and according to a queuing scheme that serializes the response to the request along with other responses to one or more other requests over the asynchronous communication channel from other members of the publishers network in accordance with determining the publisher's indication; and
   establishing the synchronous interactive communication channel responsive to the determination that circumvents the queuing scheme and is capable of delivering a response to the request directly to the member of the publisher's network making the request.

2. The method of claim 1 wherein determining if the response should be made through a direct communication channel further comprises:
   considering a reputation of the member in the publisher's network in comparison to the reputation of other members in the publisher's network;
   measuring activity of the member in the publisher's network in relationship to posting information, sending emails, contributing time to activities associated with the publisher; and
   evaluating a popularity and suitability of the subject matter to determine if it is more suitable to deliver the response to the request directly and not through the queuing scheme.

3. The method of claim 2 wherein the request is made using a communication channel compatible with one or more communication modalities including: voice telephonic access with voice recognition, telephonic access with touch-tone interaction, a short message service (SMS), a multimedia messaging service (MMS), an enhanced messaging service (EMS), an email and a web page submission.

4. The method of claim 1 wherein determining the response to the request includes:
   receiving a signal associated with a predetermined key on a telephone keypad that requests subsequent communication with the member take place directly rather than through messages queued in accordance with a queuing scheme.

5. The method of claim 4 wherein the direct communication with the members occurs over a communication channel selected from a set of communication channels including: a plain-old-telephone system (POTS), a wireless communication device and wireless multimedia communication device.

6. The method of claim 1 further comprising:
   receiving the request from the member referencing an inward phone number;
   processing a member phone number in addition to the inward phone number to access the published content to be provided in response to the request; and
   providing the member access to the published content as requested.

7. The method of claim 6 wherein the inward phone number is a reusable phone number keyed from a combination of a non-exclusive phone number and the member phone number associated with the published content being requested.

8. A communication apparatus that selectively transmits messages between a publisher and one or more members of a publisher's network, comprising:
   a processor configured to execute instructions;
   a memory containing instructions, when executed, cause the processor to receive a request from a member of the publisher's network to communicate with the publisher, order the request to communicate from the member of the publisher's network according to a queuing scheme that serializes the request with other requests from one or more other members of the publisher's network, determine if a response to the request from the member should be made through a synchronous interactive communication channel rather than the queuing scheme and an asynchronous communication channel, order a response from the publisher responsive to the determination and according to a queuing scheme that serializes the response to the request along with other responses to one or more other requests over the asynchronous communication channel from other members of the publishers network in accordance with determining the publisher's indication, establish the synchronous interactive communication channel responsive to the determination that circumvents the queuing scheme and is capable of delivering a response to the request directly to the member of the publisher's network making the request.

9. The apparatus of claim 8 wherein determining if the response should be made through a direct communication channel further includes instructions when executed cause the processor to,
consider a reputation of the member in the publisher's network in comparison to the reputation of other members in the publisher's network, measure activity of the member in the publisher's network in relationship to posting information, sending emails, contributing time to activities associated with the publisher, evaluate a popularity and suitability of the subject matter to determine if it is more suitable to deliver the response to the request directly and not through the queuing scheme.

10. The apparatus of claim 9 wherein the request is made using a communication channel compatible with one or more communication modalities including: voice telephonic access with voice recognition, telephonic access with touch-tone interaction, a short message service (SMS), a multimedia messaging service (MMS), an enhanced messaging service (EMS), an email and a web page submission.

11. The apparatus of claim 8 wherein the instructions that determine the response to the request further includes instruction when executed cause the processor to,
receive a signal associated with a predetermined key on a telephone keypad that requests subsequent communication with the member take place directly rather than through messages queued in accordance with the queuing scheme.

12. The apparatus of claim 11 wherein the direct communication with the members occurs over a communication channel selected from a set of communication channels including: a plain-old-telephone system (POTS), a wireless communication device and wireless multimedia communication device.

13. The apparatus of claim 8 further comprising instructions when executed cause the processor to,
receive the request from the member referencing an inward phone number, process a member phone number in addition to the inward phone number to access the published content to be provided in response to the request and provide the member access to the published content as requested.

14. The apparatus of claim 13 wherein the inward phone number is a reusable phone number keyed from a combination of a non-exclusive phone number and the member phone number associated with the published content being requested.

15. A non-transitory computer program product, tangibly stored on one or more computer-readable media, comprising instructions for causing a computer to selectively transmit messages between a publisher and one or more members of a publisher's network, the instructions when executed, arranged to:
receive a request from a member of the publisher's network to communicate with the publisher,
order the request to communicate from the member of the publisher's network according to a queuing scheme that serializes the request with other requests from one or more other members of the publisher's network;
determine if a response to the request from the member should be made through a synchronous interactive communication channel rather than the queuing scheme and an asynchronous communication channel;
order a response from the publisher responsive to the determination and according to a queuing scheme that serializes the response to the request along with other responses to one or more other requests over the asynchronous communication channel from other members of the publishers network in accordance with determining the publisher's indication; and
establish the synchronous interactive communication channel responsive to the determination that circumvents the queuing scheme and is capable of delivering a response to the request directly to the member of the publisher's network making the request.

16. The non-transitory computer program product of claim 15 wherein the instructions that determine if the response should be made through a direct communication channel further comprises instructions that:
consider a reputation of the member in the publisher's network in comparison to the reputation of other members in the publisher's network;
measure activity of the member in the publisher's network in relationship to posting information, sending emails, contributing time to activities associated with the publisher; and
evaluate a popularity and suitability of the subject matter to determine if it is more suitable to deliver the response to the request directly and not through the queuing scheme.

17. The non-transitory computer program product of claim 16 wherein the request is made using a communication channel compatible with one or more communication modalities including: voice telephonic access with voice recognition, telephonic access with touch-tone interaction, a short message service (SMS), a multimedia messaging service (MMS), an enhanced messaging service (EMS), an email and a web page submission.

18. The non-transitory computer program product of claim 15 wherein the instructions that determine the response to the request further includes instructions that:
receive a signal associated with a predetermined key on a telephone keypad that requests subsequent communication with the member take place directly rather than through messages queued in accordance with the queuing scheme.

19. The non-transitory computer program product of claim 15 wherein the direct communication with the members occurs over a communication channel selected from a set of communication channels including: a plain-old-telephone system (POTS), a wireless communication device and wireless multimedia communication device.

20. The non-transitory computer program product of claim 15 further comprising instructions that:
receive the request from the member referencing an inward phone number;
process a member phone number in addition to the inward phone number to access the published content to be provided in response to the request; and
provide the member access to the published content as requested.

21. The non-transitory computer program product of claim 20 wherein the inward phone number is a reusable phone number keyed from a combination of a non-exclusive phone number and the member phone number associated with the published content being requested.

* * * * *